US008511002B2

(12) United States Patent  (10) Patent No.: US 8,511,002 B2
Bowie et al.  (45) Date of Patent: Aug. 20, 2013

(54) MAGNETIC BIRD SCREEN

(75) Inventors: John M. Bowie, St. Marys, WV (US); Matthew W. Lewellyn, Williamstown, WV (US); Rodney D. Holbert, Mineral Wells, WV (US)

(73) Assignee: Burgess & Niple, Inc., Columbus, OH (US)

( * ) Notice: Subject to any disclaimer, the term of this patent is extended or adjusted under 35 U.S.C. 154(b) by 145 days.

(21) Appl. No.: 12/790,156

(22) Filed: May 28, 2010

(65) Prior Publication Data
US 2011/0239558 A1  Oct. 6, 2011

Related U.S. Application Data

(63) Continuation-in-part of application No. 12/752,604, filed on Apr. 1, 2010, now abandoned.

(51) Int. Cl.
*E04B 1/72* (2006.01)
(52) U.S. Cl.
USPC .......................................... 52/101; 52/DIG. 4
(58) Field of Classification Search
USPC ............. 52/101, 202, 741.14, DIG. 4; 14/74; 335/285; 119/903
See application file for complete search history.

(56) References Cited

U.S. PATENT DOCUMENTS

| 3,152,671 | A | * | 10/1964 | Mallory, Jr. | 52/654.1 |
| 3,263,736 | A | * | 8/1966 | Macomson | 160/370.21 |
| 3,367,078 | A | * | 2/1968 | Thompson, Jr. | 52/507 |
| 3,629,756 | A | * | 12/1971 | Holtz | 335/285 |
| 3,679,505 | A | * | 7/1972 | Hinderaker et al. | 156/71 |
| 3,805,872 | A | * | 4/1974 | Lorber | 160/354 |
| 4,510,986 | A | * | 4/1985 | Schwankl | 160/354 |
| 4,573,567 | A | * | 3/1986 | Swinderman | 198/860.4 |
| 4,589,157 | A | * | 5/1986 | Richard | 14/73 |
| 5,158,486 | A | * | 10/1992 | Tamame | 62/506 |
| 5,209,032 | A | * | 5/1993 | Laumeister | 52/101 |
| 5,454,183 | A | * | 10/1995 | Antonini et al. | 43/1 |
| 5,630,297 | A | * | 5/1997 | Rutherford | 52/58 |
| 5,765,319 | A | | 6/1998 | Callaghan et al. | |
| 6,044,594 | A | * | 4/2000 | Desselle | 52/101 |
| 6,076,696 | A | * | 6/2000 | Neuman | 220/230 |

(Continued)

FOREIGN PATENT DOCUMENTS

JP  04094632 A  *  3/1992

OTHER PUBLICATIONS

Thor, "Critters complicate bridge inspections", Science Buzz, Aug. 8, 2007, sciencebuzz.org/blog.

*Primary Examiner* — Christine T Cajilig
(74) *Attorney, Agent, or Firm* — Porter, Wright, Morris & Arthur, LLP

(57) ABSTRACT

A magnetic bird screen for an opening of a steel structure such as a bridge or the like includes a magnetic sheet sized to cover the access opening and at least partially overlap the steel structure at the opening so that the sheet is magnetically secured to the steel structure. The sheet has a plurality of spaced-apart holes sized sufficiently large to permit the passage of air and water therethrough and to be used as finger holes for installation and removal and sized sufficiently small to prevent the passage of pigeons therethrough. The sheet can be folded or rolled upon itself so that the sheet remains secured at one side of the opening or the sheet can be entirely removed when it is desired to have access through the opening.

10 Claims, 8 Drawing Sheets

(56) References Cited

U.S. PATENT DOCUMENTS

| | | | |
|---|---|---|---|
| 6,176,048 B1 * | 1/2001 | Berger | 52/101 |
| 6,397,617 B1 * | 6/2002 | Johnson | 62/259.1 |
| 6,484,462 B2 * | 11/2002 | Shreiner et al. | 52/393 |
| 6,543,864 B2 * | 4/2003 | Cline | 312/3 |
| 6,918,214 B2 | 7/2005 | Sabine | |
| 7,128,798 B2 * | 10/2006 | Boudouris et al. | 156/244.17 |
| 7,244,470 B2 * | 7/2007 | Niles | 427/421.1 |
| 7,338,573 B2 * | 3/2008 | Boudouris et al. | 156/244.11 |
| 7,849,616 B2 * | 12/2010 | Bolton | 40/600 |
| 7,900,408 B2 * | 3/2011 | Holland et al. | 52/202 |
| 2002/0069599 A1 * | 6/2002 | Dhallan | 52/302.1 |
| 2002/0112409 A1 * | 8/2002 | Knowles | 52/19 |
| 2004/0009370 A1 * | 1/2004 | Abe | 428/693 |
| 2005/0274060 A1 * | 12/2005 | Lederle et al. | 43/132.1 |
| 2007/0101909 A1 * | 5/2007 | Poyorena | 108/90 |
| 2008/0030043 A1 * | 2/2008 | Camps | 296/98 |
| 2009/0133342 A1 * | 5/2009 | Copeland | 52/202 |

* cited by examiner

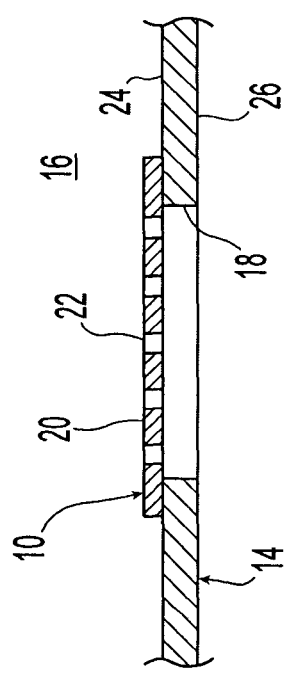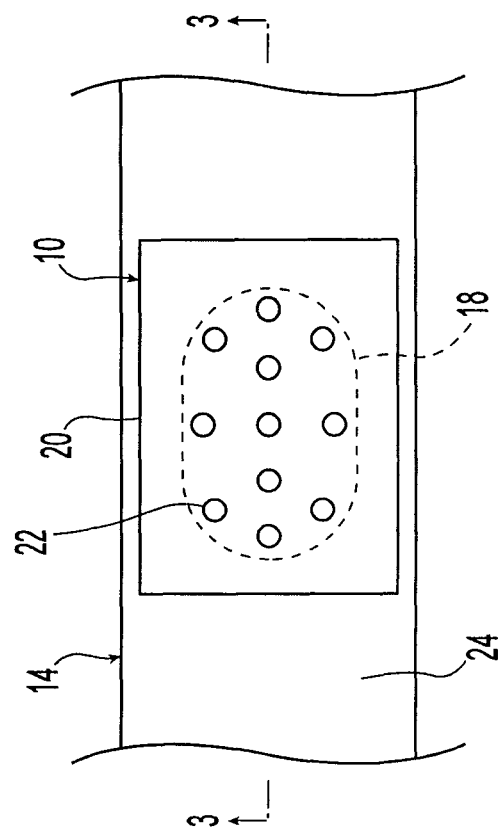

MAGNETIC BIRD SCREEN

CROSS-REFERENCE TO RELATED APPLICATIONS

This application is a continuation-in-part application claiming the benefit of patent application Ser. No. 12/752,604 filed Apr. 1, 2010, now abandoned the disclosure of which is expressly incorporated herein in its entirety by reference.

STATEMENT REGARDING FEDERALLY SPONSORED RESEARCH

Not Applicable

REFERENCE TO APPENDIX

Not Applicable

FIELD OF THE INVENTION

The field of the present invention generally relates to devices for preventing bird intrusion and, more particularly, devices for preventing birds from entering enclosed spaces in bridge structures.

BACKGROUND OF THE INVENTION

Pigeons, and droppings cause by the pigeons, is a constant menace to bridge inspectors and bridge maintenance crews. Some bridge steel members or structures such as, for example, box beams have interior spaces that are enclosed except for access openings. The access openings are provided so that bolts can be tightened on the interior sides and/or bridge inspectors can look inside for signs of fatigue cracks etc.

These access openings can also be used by pigeons to get inside the steel members and build nests. With pigeons in the bridge come heavy amounts of droppings. The pigeon droppings can be corrosive to the metal and can obscure surfaces that need to be inspected. As a result, bridges need to be cleaned before they can be adequately inspected. The cleaning of a bridge alone can be very expensive.

Several methods have been used to keep pigeons from accessing interior portions of steel members. One method is to bolt metal covers over the access openings. However, it is time consuming to remove and reinstall the covers for each inspection. As a result, the cost can be nearly as much as cleaning the bridge. Another method is to clip plastic covers over the access openings. For example, see U.S. Pat. No. 5,209,032, the disclosure of which is expressly incorporated herein in its entirety by reference. However, these plastic covers are only slightly less time consuming and expensive to remove and reinstall for each inspection. In fact, some people have questioned whether not removing plastic covers limited the views of inspectors prior to the collapse of the I-35W Mississippi River bridge in Minneapolis, Minn. in 2007. Accordingly, there is a need for improved devices and methods for keeping pigeons out of the interior portions of steel members.

SUMMARY OF THE INVENTION

Disclosed are methods and devices for covering access opening of steel structures which address one or more issues of the related art. One disclosed embodiment is a screen for an opening of a steel structure. The screen comprises a sheet sized to cover the opening and to at least partially overlap the steel structure at the opening. The sheet has a plurality of spaced-apart holes sized sufficiently large to permit the passage of air and water therethrough and to be used as finger holes for installation and removal and sized sufficiently small to prevent the passage of pigeons therethrough. The sheet includes a magnetic portion for magnetically securing the sheet to the steel structure.

Another disclosed embodiment is a bridge comprising, in combination: a steel structure forming an enclosed space and having an opening providing access to the enclosed space, and a sheet sized to cover the opening and to at least partially overlap the steel structure at the opening. The sheet has a plurality of spaced-apart holes sized sufficiently large to permit the passage of air and water therethrough and to be used as finger holes for installation and removal of the sheet and sized sufficiently small to prevent the passage of pigeons therethrough. The sheet includes a magnetic portion for magnetically securing the sheet to the steel structure.

A further disclosed embodiment is method for preventing birds from entering an opening of a steel structure. The method comprises, in combination, obtaining a sheet sized to cover the opening and to at least partially overlap the steel structure at the access opening, and magnetically securing the sheet to the steel structure. The sheet has a plurality of spaced-apart holes sized sufficiently large to permit the passage of air and water therethrough and to be used as finger holes for installation and removal of the sheet and sized sufficiently small to prevent the passage of pigeons therethrough.

From the foregoing disclosure and the following more detailed description of various preferred embodiments it will be apparent to those skilled in the art that the present invention provides a significant advance in the technology and art of bird screens for access openings of steel structures. Particularly significant in this regard is the potential the invention affords for providing a low cost, easily removed and reinstalled screen which prevents birds from entering access openings of steel structures. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 2 is a top plan view of the bird screen of FIG. 1, wherein portions of the steel members have been removed for clarity;

FIG. 3 is a sectional view taken along line 3-3 of FIG. 2;

Figure 1:
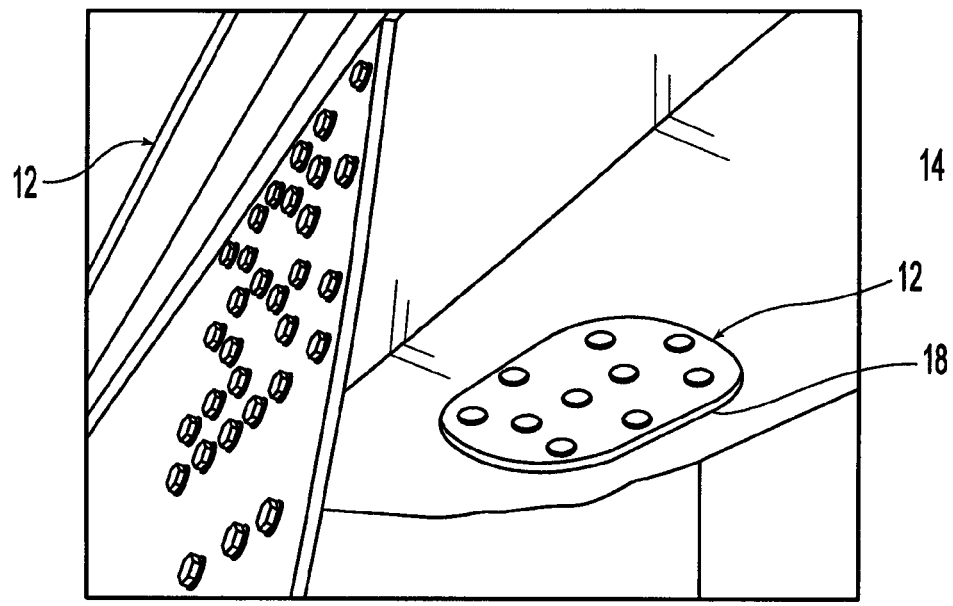
FIG. 1 is a perspective view of a portion of a bridge having a bird screen covering an opening according to a first embodiment of the present invention.
Figure 5:
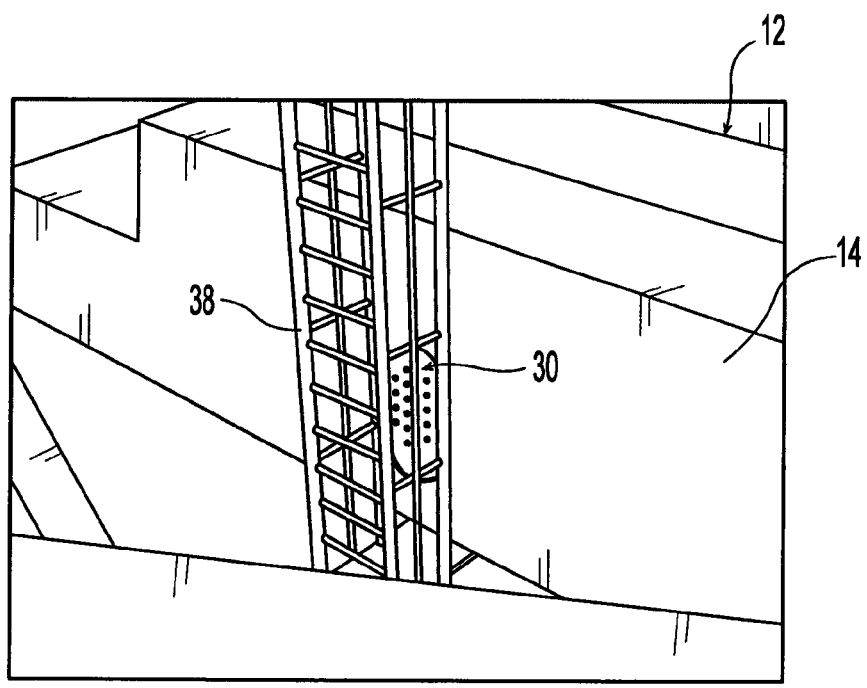
FIG. 5 is a perspective view of a portion of a bridge having a bird screen covering an opening according to a second embodiment of the present invention.

It should be understood that the appended drawings are not necessarily to scale, presenting a somewhat simplified representation of various preferred features illustrative of the basic principles of the invention. The specific design features of the bird screens as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the bird screens illustrated in the drawings. In general, up or upward generally refers to an upward direction within the plane of the paper in FIGS. 1 and 5 and down or downward generally refers to a downward direction within the plane of the paper in FIGS. 1 and 5.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved bird screens disclosed herein. The following detailed discussion of various alternative and preferred embodiments will illustrate the general principles of the invention. Other embodiments suitable for other applications will be apparent to those skilled in the art given the benefit of this disclosure.

Referring now to the drawings, FIGS. 1 to 4B show a magnetic bird screen 10 installed on a bridge 12 according to a first embodiment of the present invention. The illustrated bridge 12 includes a steel member or structure 14 forming an enclosed interior space 16 and having an access opening 18 providing access to the enclosed interior space 16 within the steel member 14. The illustrated steel member 14 is a horizontally extending box beam but it is noted that the steel member 14 can alternatively be other types of steel members and/or the steel member 14 can alternatively be vertically extending or inclined. The illustrated access opening 18 is located in a horizontal plate at the bottom of the steel member 14. It is noted, however, that the access opening 18 can alternatively be located at any other suitable side of the steel member 14. The illustrated access opening 18 has a length of about 12 inches and width of about 8 inches and has rounded ends but it is noted that the access opening 18 can alternatively have any other suitable size and/or shape.

The illustrated magnetic bird screen 10 includes a sheet 20 sized to entirely cover the access opening 18 and to overlap the steel member 14 entirely about the periphery of the access opening 18. The illustrated sheet 20 is rectangular shaped and generally planar having a length of about 16 inches and a width of about 11½ inches. It is noted however that the sheet 20 can alternatively have any other suitable size and/or shape. Sized in this manner, the sheet 20 overlaps the steel structure form about 1¾ inches to about 2 inches around the access opening 18. The illustrated sheet 20 is thin enough so that it is sufficiently flexible to be selectively rolled or folded upon itself and/or inserted through the access opening 18. Rolled or folded in this manner, the sheet 20 can remain secured at one side of the access opening 18 when it is desired to enter the access opening 18 (best shown in FIG. 4). It is noted, however, that the sheet 20 can alternatively be rigid.

The illustrated sheet 20 has a plurality of spaced-apart holes 22 sized sufficiently large to permit the passage of air and water therethrough and to be used as finger holes for installation and removal and sized sufficiently small to prevent the passage of pigeons therethrough. The illustrated holes 22 are circular and have a diameter of about 1 inch but it is noted that any other suitable size and/or shape can alternatively be utilized. The illustrated sheet 20 includes eleven of the holes 22 but it is noted that any other suitable quantity of the holes 22 can alternatively be utilized. It should be appreciated that a larger size and/or quantity of the holes 22 reduces pressure formed on the magnetic bird screen 10 by wind and/or water engaging the magnetic bird screen 10 from the environment.

The illustrated sheet 20 is entirely formed by a sheet magnet so that the sheet magnet entirely covers the access opening 18 and overlaps the steel structure 14 entirely about the access opening 18. Formed in this manner, the sheet 20 is magnetically secured to the steel structure 14 entirely about the access opening 18. The sheet magnet can comprise any suitable type of magnetic material which will provide suitable attraction to the steel member 14 and withstand the natural elements at the location of the steel member 14. Suitable sheet magnet material is available from the Magnum Magnetics Corporation of Marietta, Ohio. It is noted that the magnetic sheet can alternatively form less than the entire sheet 20 as described in more detail hereinafter.

Figure 4A:
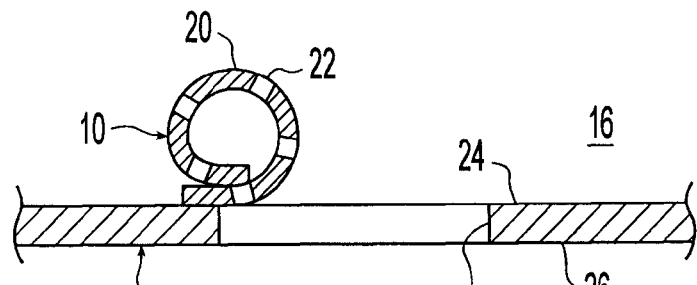
FIG. 4A is a sectional view similar to FIG. 3 but wherein the magnetic bird screen is in a retracted configuration.
Figure 4B:
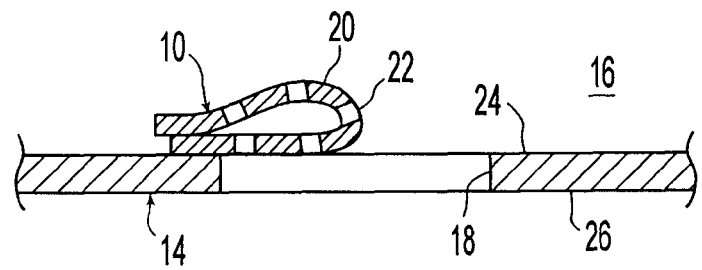
FIG. 4B is another sectional view similar to FIG. 3 but wherein the magnetic bird screen is in a retracted configuration.
Figure 8A:
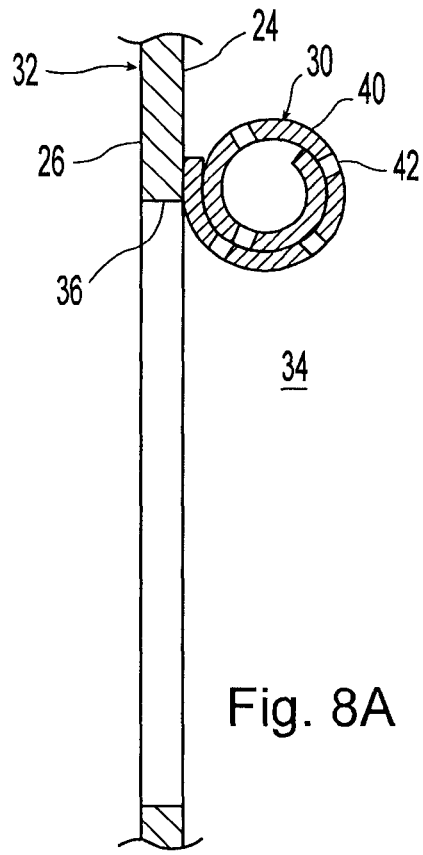
FIG. 8A is a sectional view similar to FIG. 7 but showing the bird screen in a retracted configuration.
Figure 8B:
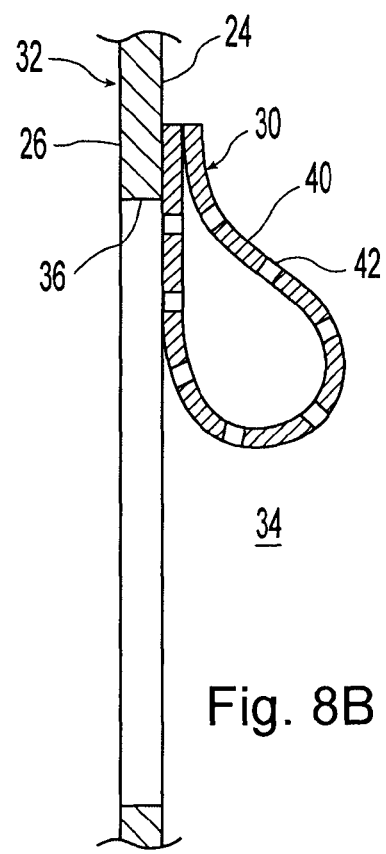
FIG. 8B is another sectional view similar to FIG. 7 but showing the bird screen in a retracted configuration.
Figure 7:
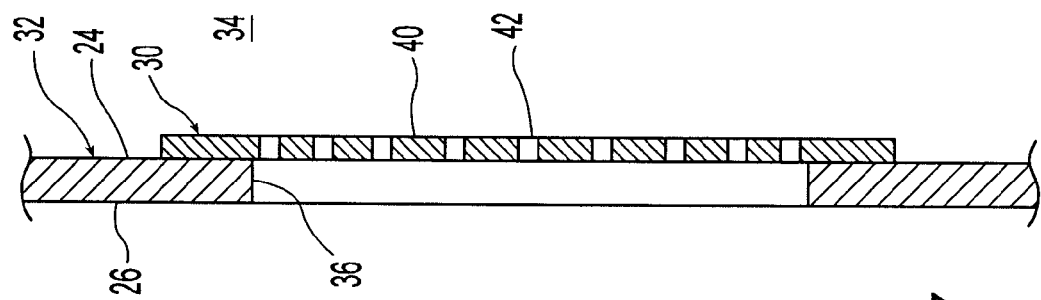
FIG. 7 is a sectional view taken along line 7-7 of FIG. 6.
Figure 6:
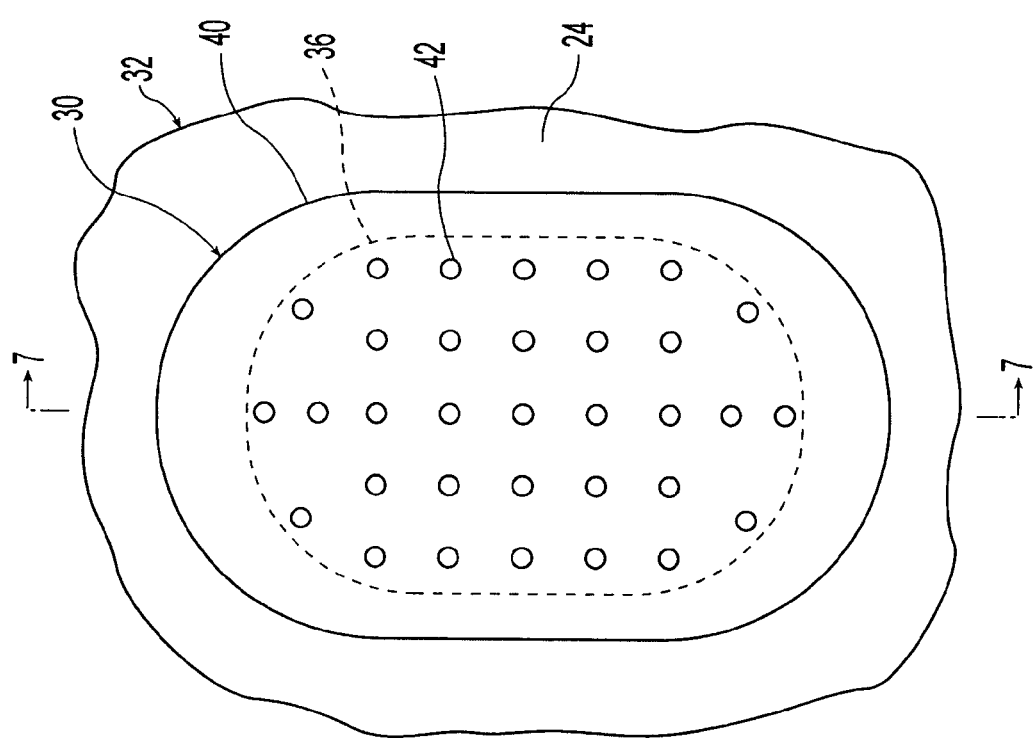
FIG. 6 is a top plan view of the bird screen of FIG. 5, wherein portions of the steel members have been removed for clarity.

To close the access opening 18, the magnetic bird screen 10 is placed entirely over the access opening 18 so that it is magnetically secured to the steel member 14 entirely about the periphery of the access opening 18. Secured in this manner, birds such as pigeons cannot enter and nest in the interior space 16 of the steel member 14 through the access opening 18. However, wind passes through the holes 22 so that the magnetic bird screen remains secured in place. The magnetic bird screen 10 is preferably secured to an inner surface 24 of the steel member 14 so that the magnetic bird screen 10 is located with the enclosed interior space 16 so that the magnetic bird screen 10 is likely to be retained by the steel member 14 if the magnetic bird screen 10 is unexpectedly dislodged form the steel member 14. It is noted, however, that the magnetic bird screen 10 can alternatively be secured to an outer surface 26 of the steel member 14 so that the magnetic bird screen 10 is located on the outside of the steel member 14 but the magnetic bird screen 10 may fall if the magnetic bird screen 10 is unexpectedly dislodged from the steel member 14. As best shown in FIGS. 4A and 4B, when it is desired to gain access through the access opening 18, the magnetic bird screen 10 can be easily rolled or folded back upon itself toward one end of the access opening 18 to a retracted configuration by pulling on the magnetic bird screen 10 with fingers located in selected ones of the holes 22. Retracted in the manner, the magnetic bird screen 10 can remain magnetically secured to the steel member 14 at one end of the access opening 18 while an inspector, maintenance worker, or the like gains access through the access opening 18 to perform an inspection, maintenance, or the like. It is noted, however, that the magnetic bird screen 10 can alternatively be entirely removed from the steel member 14. When access through the access opening 18 is no longer desired, the magnetic bird screen 10 is rolled or folded back to its extended configuration to entirely cover the access opening 18. It is noted fingers located in selected ones of the holes can be utilized to pull the magnetic bird screen back into place. This process can be quickly and easily accomplished without the need for tools.

FIGS. 5 to 8B show a magnetic bird screen 30 installed on the bridge 12 according to a second embodiment of the present invention which is substantially the same as the first embodiment described hereinabove. The illustrated bridge 12 includes another steel member or structure 32 forming an enclosed interior space 34 and having an access opening 36 providing access to the enclosed interior space 34 within the steel member 32. The illustrated steel member 32 is a horizontally extending box beam but it is noted that the steel member 32 can alternatively be other types of steel members and/or the steel member 32 can alternatively be vertically extending or inclined. The illustrated access opening 36 is located in a vertical plate at lateral side of the steel member 32 and is provided with an access ladder 38 located along the side of the steel member. It is noted, however, that the access opening 36 can alternatively be located at any other suitable side of the steel member 32. The illustrated access opening 36 has a length of about 30 inches and width of about 20 inches and has rounded ends but it is noted that the access opening 36 can alternatively have any other suitable size and/or shape.

The illustrated magnetic bird screen 30 includes a sheet 40 sized to entirely cover the access opening 36 and to overlap the steel structure 14 entirely about the periphery of the access opening 36. The illustrated sheet is rectangular shaped with rounded ends and generally planar having a length of about 40 inches and a width of about 25 inches. It is noted however that the sheet 40 can alternatively have any other suitable size and/or shape. Sized in this manner, the sheet 40 overlaps the steel structure 32 form about 2½ inches to about 5 inches around the access opening 36. The illustrated sheet 40 is thin enough so that it is sufficiently flexible to be selectively rolled or folded upon itself and/or inserted through the access opening 36. Rolled or folded in this manner, the sheet 40 can remain magnetically secured at one side of the access opening 36 when it is desired to enter the access opening 36 (best shown in FIGS. 8A and 8B). It is noted, however, that the sheet 40 can alternatively be rigid.

The illustrated sheet 40 has a plurality of spaced-apart holes 42 sized sufficiently large to permit the passage of air and water therethrough and to be used as finger holes for installation and removal and sized sufficiently small to prevent the passage of pigeons therethrough. The illustrated holes 42 are circular and have a diameter of about 1 inch but it is noted that any other suitable size and/or shape can alternatively be utilized. The illustrated sheet 40 includes thirty three of the holes 42 but it is noted that any other suitable quantity of the holes 42 can alternatively be utilized. It should be appreciated that a larger size and/or quantity of the holes 42 reduces the pressure formed on the magnetic bird screen 30 by wind and/or water engaging the magnetic bird screen 30.

The illustrated sheet 40 is entirely formed by a sheet magnet so that the sheet magnet entirely covers the access opening 36 and overlaps the steel structure 32 entirely about the access opening 36. Formed in this manner, the sheet 40 is magnetically secured to the steel structure 32 entirely about the access opening 36. The sheet magnet can comprise any suitable type of magnetic material which will provide suitable attraction to the steel member 32 and withstand the natural elements at the location of the steel member 32. Suitable sheet magnet material is available from the Magnum Magnetics Corporation of Marietta, Ohio. It is noted that the magnetic sheet can alternatively form less than the entire sheet 40 as described in more detail hereinafter.

Figure 9:
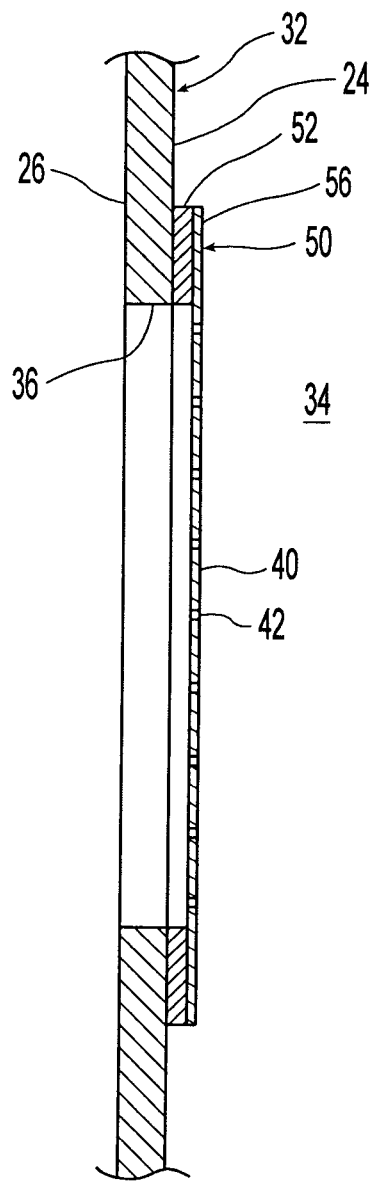
FIG. 9 is a sectional view similar to FIG. 7 but showing a variation of the bird screen wherein the separate magnetic and screen layers are provided.

FIG. 9 shows a magnetic bird screen 50 which is substantially the same as the magnetic bird screen 30 described hereinabove and like reference numbers are utilized to identify like structure. The magnetic bird screen 50 has a sheet 40 that only a portion of which is magnetic. The illustrated sheet 50 has two separate layers. A first or magnetic layer 52 is a magnetic sheet sized to generally cover the entire overlap between the sheet 40 and the steel member 32. The illustrated magnetic layer has 52 a central opening 54 generally sized to match the access opening 36 but the central opening can alternatively be of any other suitable size. It is noted that the magnetic layer 52 can be formed by one or more segments of the magnetic sheet. A second or nonmagnetic layer 56 covers the central opening 54 in the magnetic layer 52 so that the entire access opening 36 is covered by the sheet 40. The nonmagnetic layer 56 can be of any suitable material such as, for example, metal, plastic, or the like and can be in any suitable form such as a sheet, net, or the like. The nonmagnetic layer 56 is preferably made of a material suitable for the environmental conditions and should be sufficiently flexible so that the magnetic bird screen 50 can be rolled or folded upon itself as described hereinabove. It is noted, however, that the nonmagnetic layer 56 can alternatively be rigid. The nonmagnetic layer 52 can be secured to the magnetic layer 52 in any suitable manner such as, for example, adhesive, mechanical fasteners, or the like.

Figure 10:
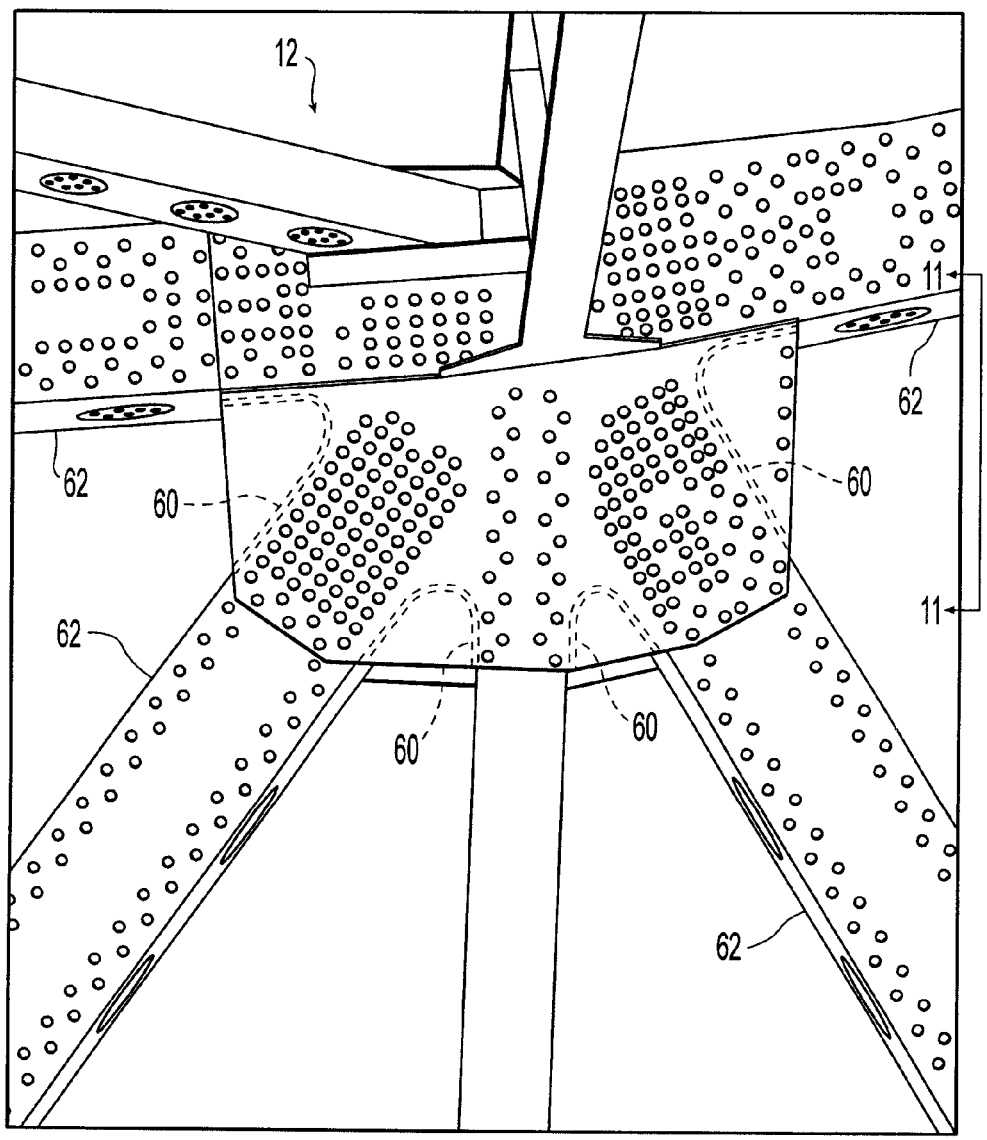
FIG. 10 is a perspective view of a portion of a bridge having bird screens covering openings according to a third embodiment of the present invention.
Figure 11:
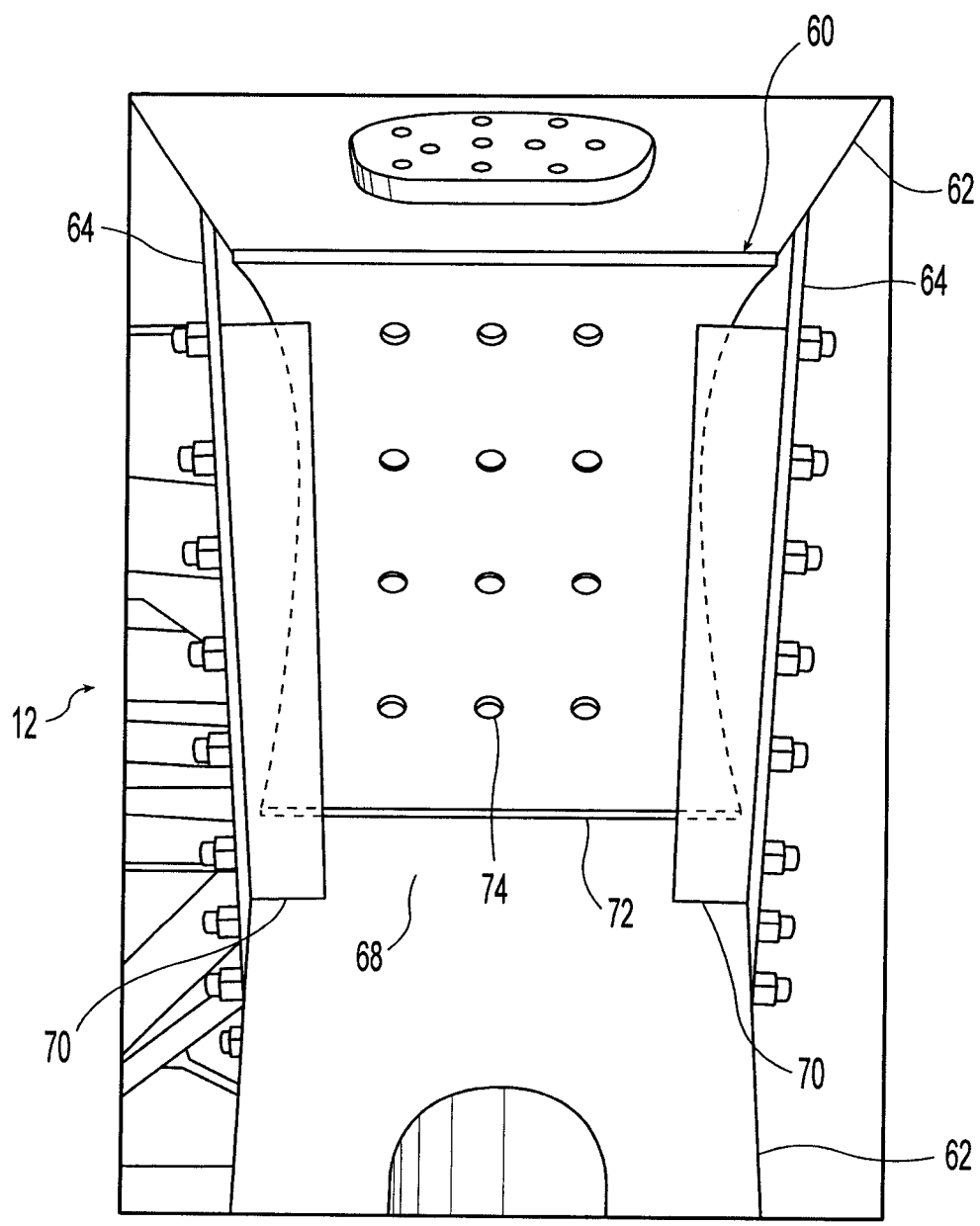
FIG. 11 is an enlarged elevational view taken along line 11-11 of FIG. 10.
Figure 12:
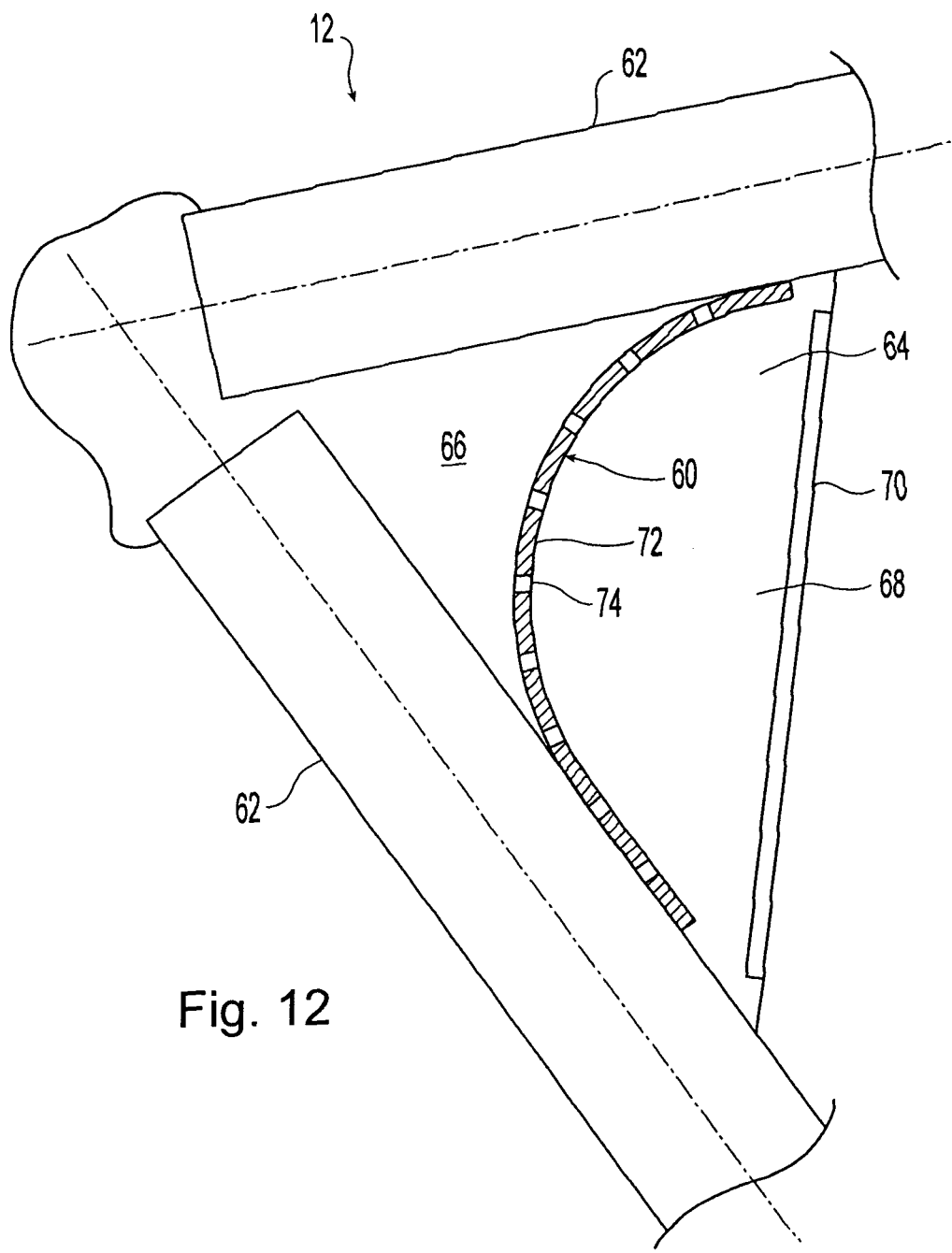
FIG. 12 is an enlarged, sectional view of a portion of FIG. 10 at the bird screen of FIG., wherein some components have been removed for clarity.

FIGS. 10 to 12 show a magnetic bird screen 30 installed on the bridge 12 according to a third embodiment of the present invention which is substantially the same as the first and second embodiments described hereinabove. The illustrated bridge 12 includes a plurality steel truss members 62 that intersect at a gusset plate connection. Gusset plates 64 are secured at lateral sides of the truss members 62 to secure the truss members 62 together. Enclosed interior spaces 66 are formed between the gusset plates 64 and adjacent intersecting truss members 62. The illustrated five truss members 62 form a total of five enclosed interior spaces 66 at the gusset plate connection. Each enclosed interior space 66 has an opening 68 formed at the edge of the gusset plates 64 that provide access to the enclosed interior space 66. The illustrated opening 68 is partially closed by laterally inward extending flanges 70 secured to the gusset plates 64.

The illustrated magnetic bird screen 30 includes a sheet 72 sized to entirely cover the opening 68 by extending entirely between the gusset plates 64 and to partially overlap the truss members 62 at the top and bottom of the opening 68. The illustrated sheet 72 is rectangular shaped and generally planar. It is noted however that the sheet 72 can alternatively have any other suitable size and/or shape. The illustrated sheet 72 is thin enough so that it is sufficiently flexible to be partially folded or curved to be attached to the truss members 62 intersecting at an acute angle. It is noted, however, that the sheet 72 can alternatively be rigid if it is formed in the desired curved shaped or other suitable shape to engage the intersecting members 62.

The illustrated sheet 72 has a plurality of spaced-apart holes 74 sized sufficiently large to permit the passage of air and water therethrough and to be used as finger holes for installation and removal and sized sufficiently small to prevent the passage of pigeons therethrough. The illustrated holes 74 are circular and have a diameter of about 1 inch but it is noted that any other suitable size and/or shape can alternatively be utilized. It is noted that any other suitable quantity of the holes 74 can alternatively be utilized.

The illustrated sheet 72 is entirely formed by a sheet magnet so that the sheet magnet entirely covers the opening 68 and overlaps the truss members 62 at the top and bottom of the opening 68. Formed in this manner, the sheet 72 is magnetically secured to the truss members 62 to close the access opening 68. The sheet magnet can comprise any suitable type of magnetic material which will provide suitable attraction to the truss members 62 and withstand the natural elements at the location of the gusset plate connection of the truss members 62. Suitable sheet magnet material is available from the Magnum Magnetics Corporation of Marietta, Ohio. It is noted that the magnetic sheet can alternatively form less than the entire sheet 72 as described in detail hereinabove with reference to FIG. 9.

Any of the features or attributes of the above the above described embodiments and variations can be used in combination with any of the other features and attributes of the above described embodiments and variations as desired.

It is apparent from the above detailed description of preferred embodiments of the present invention, that magnetic bird screens 10, 30, 50, 60 of the present invention effectively close access openings to prevent entry of birds such as pigeons and are relatively inexpensive to produce. The magnetic bird screens 10, 30, 50, 60 of the present invention can also be quickly and easily installed, removed, and reinstalled without the need for tools.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A bridge comprising, in combination:
a steel structure forming an enclosed space and forming an opening providing access to the enclosed space;
a sheet sized to cover the opening and to at least partially overlap the steel structure at the opening;
wherein the sheet has a plurality of spaced-apart holes sized sufficiently large to permit passage of air and water therethrough and sized sufficiently small to prevent passage of pigeons therethrough;
wherein the sheet includes a magnetic portion for magnetically securing the sheet to the steel structure;
wherein the sheet is sufficiently flexible to be selectively removed from the steel structure at one side of the opening, folded upon itself, and secured to the steel structure at an opposite side of the opening so that the sheet remains secured to and supported by the steel structure at the opposite side of the opening in a retracted configuration when it is desired to have access through the opening; and
wherein the steel structure is a truss bridge having at least two members forming an acute angle therebetween and the sheet is secured between the two members and is flexible enough that the sheet is partially folded and curved between the two members when covering the opening.

2. The bridge according to claim 1, wherein the magnetic portion is sized and shaped to extend entirely about the access opening.

3. The bridge according to claim 1, wherein the sheet comprises a sheet magnet sized to cover the opening.

4. The bridge according to claim 1, wherein the holes are about one inch in diameter.

5. The bridge according to claim 1, wherein the sheet is magnetically secured to a surface of the steel structure within the enclosed space.

6. A method for preventing birds from entering an opening of a steel structure, said method comprising, in combination:
obtaining a sheet sized to cover the opening and to at least partially overlap the steel structure at the opening;
wherein the sheet has a plurality of spaced-apart holes sized sufficiently large to permit passage of air and water therethrough and to be used as finger holes for installation and removal and sized sufficiently small to prevent passage of pigeons therethrough;
magnetically securing the sheet to the steel structure to close the opening;
removing the sheet from the steel structure at one side of the opening, folding the sheet upon itself, and securing the sheet to the steel structure at an opposite side of the opening so that the sheet remains secured to and supported by the steel structure at the opposite side of the opening in a retracted configuration when it is desired to have access through the opening; and
wherein the steel structure is a truss bridge having at least two members forming an acute angle therebetween and the sheet between the two members; and
partially folding the sheet so that the sheet is curved between the two members when covering the opening.

7. The method according to claim 6, wherein the obtaining a sheet step includes obtaining the magnetic portion sized and shaped to extend entirely about the opening.

8. The method according to claim 6, wherein the obtaining a sheet step includes obtaining the sheet comprising a sheet magnet sized to cover the opening and to at least partially overlap the steel structure at the opening.

9. The method according to claim 6, wherein the obtaining a sheet step includes obtaining the sheet sufficiently flexible to be folded upon itself.

10. A method for preventing birds from entering an opening of a steel structure, said method comprising, in combination:
obtaining a sheet sized to cover the opening and to at least partially overlap the steel structure at the opening;
wherein the sheet has a plurality of spaced-apart holes sized sufficiently large to permit passage of air and water therethrough and to be used as finger holes for installation and removal and sized sufficiently small to prevent passage of pigeons therethrough;
magnetically securing the sheet to the steel structure to close the opening;
removing the sheet from the steel structure at one side of the opening, folding the sheet upon itself and securing the sheet to the steel structure at an opposite side of the opening so that the sheet remains secured to and supported by the steel structure at the opposite side of the opening in a retracted configuration when it is desired to have access through the opening;
wherein the steel structure forms an enclosed space and the opening provides access to the enclosed space and wherein the step of magnetically securing the sheet includes magnetically securing the sheet to a surface of the steel structure within the enclosed space;

wherein the steel structure is a truss bridge having at least two members forming an acute angle therebetween and the sheet is, magnetically secured between the two members; and partially folding the sheet so that the sheet is curved between the two members when covering the opening.

\* \* \* \* \*